UNITED STATES PATENT OFFICE.

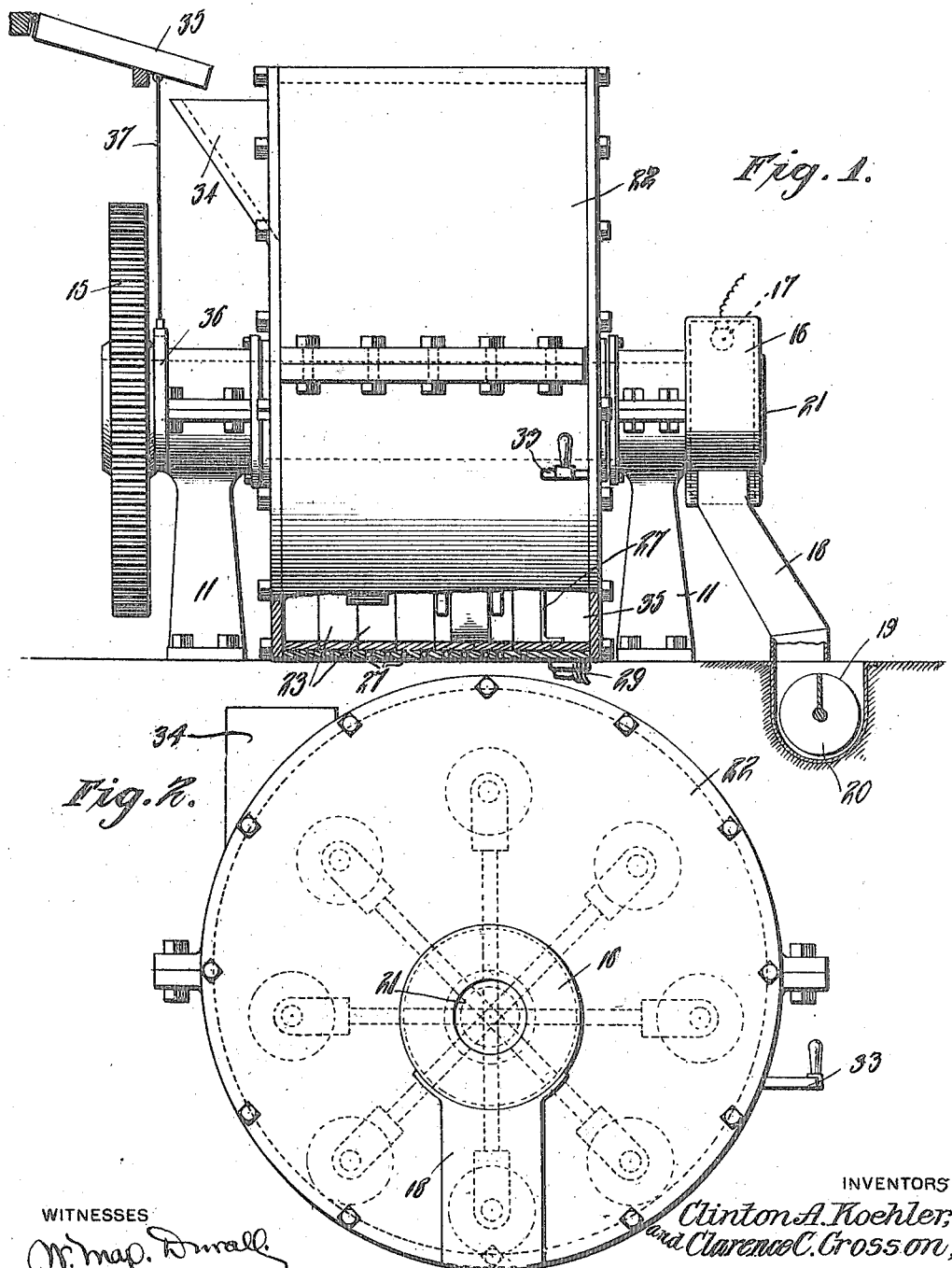

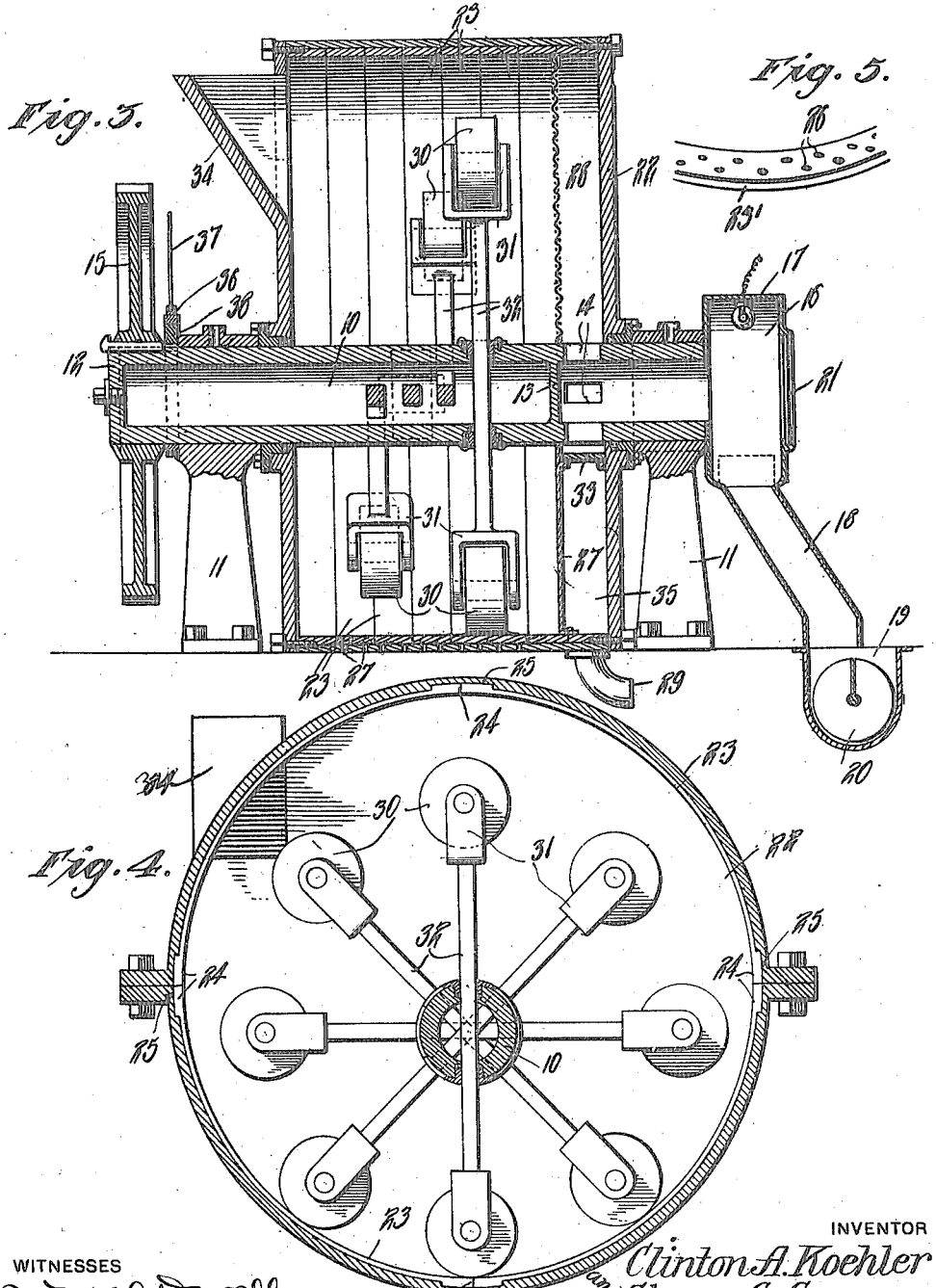

CLINTON A. KOEHLER, OF EASTON, PENNSYLVANIA, AND CLARENCE C. CROSSON, OF ALPHA, NEW JERSEY.

PULVERIZING-MACHINE.

1,257,882.        Specification of Letters Patent.        Patented Feb. 26, 1918.

Application filed August 14, 1916. Serial No. 114,820.

*To all whom it may concern:*

Be it known that we, CLINTON A. KOEHLER and CLARENCE C. CROSSON, citizens of the United States, residing at Easton, Pa., and Alpha, N. J., in the counties of Northampton and Warren and States of Pennsylvania and New Jersey, respectively, have invented certain new and useful Improvements in Pulverizing-Machines, of which the following is a specification.

This invention relates to an improved pulverizing machine which will be used for pulverizing cement or other materials and the principal object of the invention is to provide a device so constructed that the cement may be ground and sifted and then conveyed from the machine to a suitable receptacle or to a point where it is to be used.

Another object of the invention is to so construct this machine that it may be used either for grinding the cement either very fine or to a less degree, separate outlet means being provided for the different grades of cement or other materials ground.

Another object of the invention is to so construct this machine that the drum forming the body portion of the machine may be readily taken apart in case it is desired to remove the hoops against which the grinding rollers operate.

Another object of the invention is to so construct this machine that the roller carrying arms may be slidably mounted in the shaft and to so position these arms that the rollers will move the cement longitudinally of the shaft in the grinding drum.

Another object of the invention is to so construct this machine that the shaft may form one of the outlets for the powdered cement.

This invention is illustrated in the accompanying drawings, wherein:—

Figure 1 is a view showing the improved grinding machine principally in side elevation, the lower portion of the grinding drum being broken away and the conveyer used in connection with the machine being shown in section.

Fig. 2 is a view showing the improved machine in end elevation.

Fig. 3 is a view showing the machine in vertical longitudinal section.

Fig. 4 is a vertical transverse sectional view through the machine.

Fig. 5 is a fragmentary perspective view of one of the tires which may be placed in the pulverizing drum when the cement or other material is to be granulated instead of powdered.

The shaft 10 is rotatably mounted in the bearings of the supporting standards 11 and as will be seen from an inspection of Fig. 3 is closed at one end by means of the head 12 and is provided at a point intermediate its length with a partition 13 positioned adjacent the inlet opening 14. This shaft carries a device by means of which it may be rotated, a gear wheel 15 being shown in the illustration as indicating one device which could be used. The open end of this shaft communicates with a housing 16 illuminated by the electric bulb 17 and provided with a chute or spout 18 leading to a trough 19 in which there is positioned a screw conveyer 20. It will thus be seen that the powdered cement which passes into the housing 16 may pass through the chute 18 and into the trough 19 where it will be engaged by the screw conveyer 20 and carried to a suitable point where it may be used or placed in suitable receptacles. A window 21 is provided so that the operator of the machine may readily see whether the cement is feeding through the housing 16 properly.

The pulverizing drum 22 is positioned about the shaft 10 and is formed of separable parts as clearly shown in the various views so that when desired the upper portion of this drum may be removed and the strips 23 which are termed tires removed and new ones put in place. These strips or tires 23 are provided with enlargements 24 fitting into pockets 25 and it will thus be seen that these tires cannot turn in the drum when the machine is in operation. When grinding fine cement, the tires of the lower portion of the machine will be solid strips whereas if it is desired to grind a coarser grade cement, the solid tires of the lower portion of the machine will be removed and the tires 23' of Fig. 5 will be substituted. These tires 23' are provided with openings 26 which will register with the openings 27 formed in the lower portion or base of the grinding drum. The cement will pass through these openings when ground to a sufficient grade and will drop into a hopper or any other suitable receptacle or conveyer placed beneath the machine. At one end of the grinding drum there is provided a partition 27 which is positioned in the lower portion of the drum and beneath a screen 28 which is positioned in the upper portion of this drum. This partition is provided to prevent the ground cement from passing into the outlet pipe 29 which may lead to any suitable point and further prevents the partially ground cement from moving to a point where it could not be engaged by the grinding rollers. The grinding rollers 30 are rotatably mounted in the yokes 31 of the bars 32 which bars are slidably mounted in openings formed in the shaft 10 and from an inspection of Figs. 3 and 4, it will be readily seen that as this shaft rotates, the rollers will engage the lower portion of the machine thus causing the cement to be ground in the drum between the rollers and the tires or strips 23. The finely ground cement passes through the screen 28 and if the slide 33 is pushed inwardly as shown in Fig. 3, the powdered cement will collect upon this slide and as the shaft rotates, it will be taken up by the shaft and will move through the shaft to the housing 16.

When this machine is in use, it is set up as clearly shown in the drawings and the cement is fed into the drum through the inlet chute or hopper 34. This cement is placed upon the platform 35 which is connected with the collar 36 by means of the rods 37 and as the shaft rotates, the cam 38 will cause this platform to vibrate thus dropping the cement into the chute 34. The cement will thus be continuously fed to the machine in the desired quantity. As the cement drops into the machine it is engaged by the rollers and as it is ground, it will be gradually moved longitudinally of the drum due to the action of the rollers which are set in the machine in such a position, that they may move the cement across the drum as they rotate. If the cement is to be ground into a rather coarse state, the tires shown in Fig. 5 will be used and the ground cement will pass through the alined openings and into the receptacle or hopper placed beneath the machine. If on the other hand, it is to be ground into a very fine powder, the tires shown in Figs. 1 and 3 will be used and the cement will then be ground very fine and will rise in a cloud and pass through the screen 28. This powdered cement will collect either upon the slide 33 or in the bottom of the pocket 35 formed by the partition 27 and will pass out of the drum either through the outlet 29 or through the opening 14 into the shaft 10. If for any reason it is desired to have access to the rollers 30 or sliding arms 32 which carry these rollers, the upper portion of the drum can be released and removed thus exposing the rollers and roller carrying arms where they can be easily reached and any necessary repairs or alterations made.

What is claimed is:—

1. A grinding machine comprising a stationary drum, bearing standards positioned upon opposite sides of the drum, a rotatable shaft extending through said drum and rotatably supported by said standards, the shaft having one end portion hollow and provided with side openings within the drum forming inlets, a partition extending from the shaft to the lower end of the drum, a material supporting plate beneath the perforated portion of the shaft and between the partition and the end wall of the drum, a screen in said drum above the shaft and adjacent the inlet openings of the shaft, and grinding means carried by said shaft within the drum.

2. A grinding machine comprising a drum, a rotatable shaft extending through said drum and provided with a hollow end portion having inlet openings formed therein, a housing communicating with the open end of the shaft and provided with an outlet, a partition in said drum, beneath the shaft and adjacent the openings of the drum, a removable material supporting plate positioned in said drum beneath the perforated portion of the shaft and between the partition and the end of the drum, operating means carried by said shaft for grinding the material placed in the drum, and means for rotating said shaft.

In testimony whereof we affix our signatures in presence of a witness.

CLINTON A. KOEHLER,
CLARENCE C. CROSSON.

Witness:
M. E. JONES.

Copies of this patent may be obtained for five cents each, by addressing the "Commissioner of Patents, Washington, D. C."